A. & M. Falkenau & M. Pollak,
Watch-Chain Attachment,
Nº 8,968.  Patented May 25, 1852.
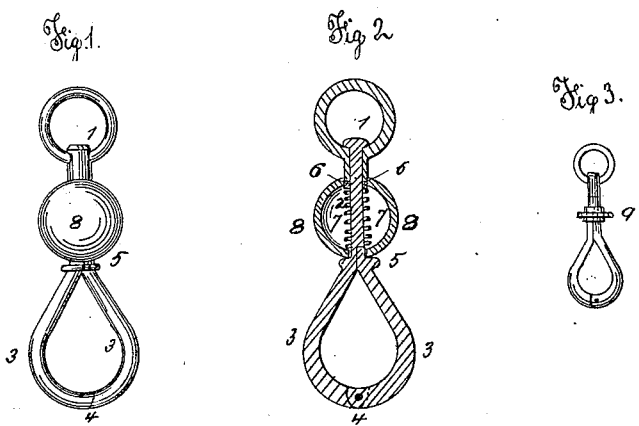
Witnesses  Inventor
W. Serrell  A. Falkenau
Lemuel W. Serrell  Morris Falkenau
  Moris Pollak

UNITED STATES PATENT OFFICE.

A. FALKENAU, M. FALKENAU, AND M. POLLAK, OF NEW YORK, N. Y.

SWIVEL-HOOK.

Specification of Letters Patent No. 8,968, dated May 25, 1852.

*To all whom it may concern:*

Be it known that we, ALBERT FALKENAU, MORRIS FALKENAU, and MORIS POLLAK, all of the city, county, and State of New York, manufacturing jewelers, have invented, made, and applied to use a new and useful improvement in the construction of swivel-hooks, such as are used to form the connection of chains with watches and jewelry and for various other purposes, which improvement consists in the application of a globular or spheroidal formed inclosure or slide on the shank between the swivel-ring and the hook in such a manner that the lower edge of the inclosure serves as a catch to the lip of the hook and is kept in place by an expansive helical or other fit spring, acting to keep the slide-catch part onto the lip of the hook.

This improvement is shown in the drawing annexed to and making part of this specification, wherein—

Figure 1, is an elevation of a swivel and hook; Fig. 2, is a sectional elevation of the same. Both these figures are drawn in larger size, to show the parts more clearly; the like marks of reference denoting the same parts, in each figure, as follows:

1 is the swivel ring; 2, the shank; 3, the hook, with joint 4, and lip 5, all made as usual. At 6, is a shoulder on the shank 2, taking the upper end of an expansive helical spring 7, that is surrounded by a globe 8, the lower edge of which forms a catch, to take the lip 5, of the hook. It will now be understood, that though the globe 8, may be rotated on the shank 2, the lip of the hook will not be disengaged, until the globe is pushed upward, toward the swivel ring 1, when the hook can be opened to attach or detach any article, as convenient. The globe and spring thus act differently to the screw and nut hitherto attached to such articles, as shown in Fig. 3, where the nut 9, can be rotated by extraneous causes, particularly when ill made, or when much worn, so that the hook ceases to be such a security as is required; while, through the action of our spring, and its inclosing slide, the hook can hardly ever, if at all, be opened by accident, or allowed to open by wear; besides which the nut is believed to be susceptible of only one form, namely that with a milled edge around it, to rotate it by; while our globe, or its equivalent, can be made in a great variety of ornamental forms, without departing from the substantial part of our improvement. And this swivel may be made of larger size, for use in various situations, such as in harness; therefore we do not limit this invention to the special use of connecting chains to watches.

We do not claim to have invented any one of the parts described and shown, as these, in themselves, separately, are not new; but We do claim—

The combination of the spring 7, and its inclosing slide 8, with a swivel hook, for the purposes, and as described and shown.

In witness whereof, we have hereunto set our signatures, this eighteenth day of February, one thousand eight hundred and fifty-two.

AL. FALKENAU.
MORRIS FALKENAU.
MORIS POLLAK.

Witnesses:
W. TERRELL,
LEMUEL W. TERRELL.